US010684856B2

(12) United States Patent
Frazier et al.

(10) Patent No.: US 10,684,856 B2
(45) Date of Patent: *Jun. 16, 2020

(54) CONVERTING MULTIPLE INSTRUCTIONS INTO A SINGLE COMBINED INSTRUCTION WITH AN EXTENSION OPCODE

(71) Applicant: International Business Machines Corporation, Armonk, NY (US)

(72) Inventors: Giles R. Frazier, Austin, TX (US); Hung Q. Le, Austin, TX (US); Jose E. Moreira, Irvington, NY (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 203 days.

This patent is subject to a terminal disclaimer.

(21) Appl. No.: 15/646,219

(22) Filed: Jul. 11, 2017

(65) Prior Publication Data

US 2019/0018677 A1 Jan. 17, 2019

(51) Int. Cl.
*G06F 9/30* (2018.01)

(52) U.S. Cl.
CPC ........ *G06F 9/3017* (2013.01); *G06F 9/30145* (2013.01); *G06F 9/30181* (2013.01)

(58) Field of Classification Search
CPC .......................... G06F 9/30145; G06F 9/30181
See application file for complete search history.

(56) References Cited

U.S. PATENT DOCUMENTS

| 6,338,136 | B1* | 1/2002 | Col ..................... G06F 9/3017 |
| | | | 711/102 |
| 8,347,067 | B2 | 1/2013 | Greenhalgh et al. |
| 8,843,729 | B2* | 9/2014 | Parks ................. G06F 9/30145 |
| | | | 712/208 |
| 8,930,682 | B2 | 1/2015 | Gutierrez et al. |
| 9,170,816 | B2 | 10/2015 | Almog et al. |
| 2013/0311754 | A1* | 11/2013 | Brown ................ G06F 9/3867 |
| | | | 712/216 |
| 2014/0149722 | A1* | 5/2014 | Brown ............... G06F 9/30167 |
| | | | 712/226 |
| 2014/0208073 | A1* | 7/2014 | Blasco-Allue ...... G06F 9/30058 |
| | | | 712/205 |
| 2016/0094340 | A1* | 3/2016 | Wolrich .................. G09C 1/00 |
| | | | 713/189 |

(Continued)

OTHER PUBLICATIONS

AU920170068US1, Appendix P; List of IBM Patent or Applications Treated as Related, Dec. 13, 2017, 2 pages.

(Continued)

*Primary Examiner* — Jacob Petranek
(74) *Attorney, Agent, or Firm* — Bryan Bortnick

(57) ABSTRACT

Converting program instructions for two-stage processors including receiving, by a preprocessing unit, a group of program instructions; determining, by the preprocessing unit, that at least two of the group of program instructions can be converted into a single combined instruction; converting, by the preprocessing unit, the at least two program instructions into the single combined instruction comprising an extension opcode, wherein the extension opcode indicates, to an execution unit, a format of the single combined instruction; and sending, by the preprocessing unit, the single combined instruction to the execution unit.

13 Claims, 5 Drawing Sheets

(56) References Cited

U.S. PATENT DOCUMENTS

2017/0177343 A1\* 6/2017 Lai .................. G06F 9/3016
2018/0267798 A1\* 9/2018 Grisenthwaite ..... G06F 9/30072

OTHER PUBLICATIONS

U.S. Appl. No. 15/795,945, to Giles R. Frazier et al., entitled, *Converting Program Instructions For Two-Stage Processors*, assigned to International Business Machines Corporation, 30 pages, filed Oct. 27, 2017.

Anonymous, *A Unified Scalar and SIMD Instruction Set Architecture: Repurposing a Scalar Instruction Set for SIMD Instruction via Mode-Sensitive Semantics*, IP.com Prior Art Database Technical Disclosure, (online), May 5, 2015, 4 pages, URL: priorart.ip.com/IPCOM/000241485.

IBM, *Interface Structure for a Programmable Co-Processor with Tightly Coupling and System Bus Interface*, IP.com Prior Art Database Technical Disclosure, (online), May 4, 2005, 5 pages, URL: priorart.ip.com/IPCOM/000124718.

\* cited by examiner

CONVERTING MULTIPLE INSTRUCTIONS INTO A SINGLE COMBINED INSTRUCTION WITH AN EXTENSION OPCODE

BACKGROUND

Field of the Invention

The field of the invention is data processing, or, more specifically, methods, apparatus, and products for converting program instructions for two-stage processors.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods, systems, and apparatus for converting program instructions for two-stage processors are disclosed in this specification. Converting program instructions for two-stage processors includes receiving, by a preprocessing unit, a group of program instructions; determining, by the preprocessing unit, that at least two of the group of program instructions can be converted into a single combined instruction; converting, by the preprocessing unit, the at least two program instructions into the single combined instruction comprising an extension opcode, wherein the extension opcode indicates, to an execution unit, a format of the single combined instruction; and sending, by the preprocessing unit, the single combined instruction to the execution unit.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
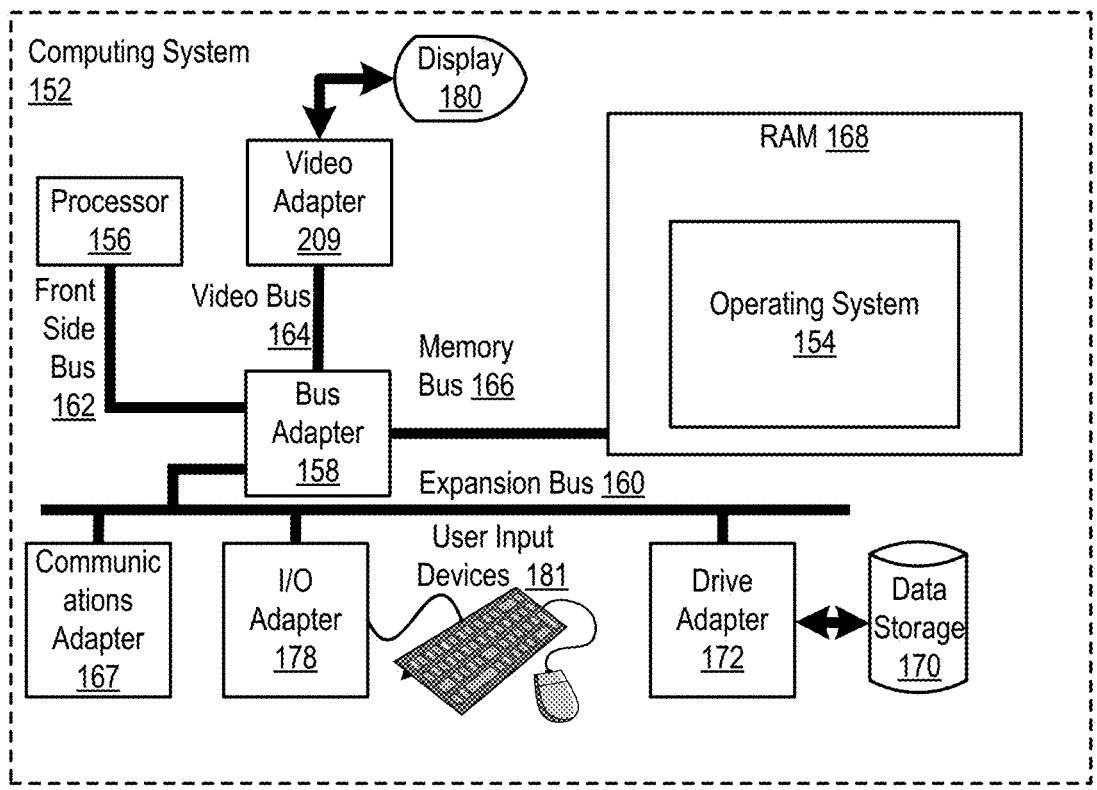
FIG. 1 sets forth a block diagram of an example system configured for converting program instructions for two-stage processors according to embodiments of the present invention.

Exemplary methods, apparatus, and products for converting program instructions for two-stage processors in accordance with the present invention are described with reference to the accompanying drawings, beginning with FIG. 1. FIG. 1 sets forth a block diagram of automated computing machinery comprising an exemplary computing system (152) configured for converting program instructions for two-stage processors according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for converting program instructions for two-stage processors according to embodiments of the present invention include UNIX™, Linux™, Microsoft Windows™, AIX™ IBM's i OS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for converting program instructions for two-stage processors according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for converting program instructions for two-stage processors according to embodiments of the present invention include modems for wired dial-up communications, Ethernet (IEEE 802.3) adapters for wired data communications, and 802.11 adapters for wireless data communications.

Figure 2:
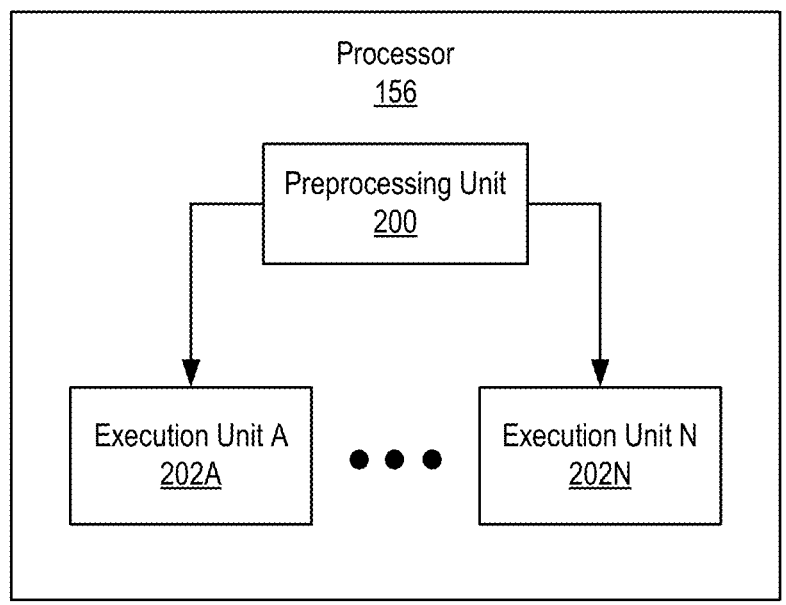
FIG. 2 sets forth a block diagram of an example system configured for converting program instructions for two-stage processors according to embodiments of the present invention.

FIG. 2 shows an exemplary processor for converting program instructions for two-stage processors according to embodiments of the present invention. As shown in FIG. 2, the exemplary processor (156) includes a preprocessing unit (200) communicatively coupled to multiple execution units (execution unit A (202A), execution unit N (202N)).

The preprocessing unit (200) is a circuit configured to convert program instructions for two-stage processors. The preprocessing unit (200) may be a portion of a processor (156) or may a separate processing unit. Further, the preprocessing unit (200) may be one of multiple preprocessing units within the processor (156). The preprocessing unit (200) receives program instructions from memory locations within a processor (156) or other locations on the computer system. The preprocessing unit (200) may convert and/or decode the program instructions in preparation for execution by the execution units (execution unit A (202A), execution unit N (202N)). The preprocessing unit (200) may decode the program instructions into internal operations for execution by the execution units (execution unit A (202A), execution unit N (202N)). As used herein, the term memory location includes registers, such as processor registers.

A program instruction is a software instruction submitted to the processor (156) for execution. Each program instruction may be one instruction from a group of instructions that make up a computer program. The program instructions may be instruction set architecture instructions that conform to a particular structure.

Each execution unit (execution unit A (202A), execution unit N (202N)) receives instructions from the preprocessing unit (200) and carries out the steps defined by the received instructions. The instructions received from the preprocessing unit (200) may be in the form of single combined instructions converted from multiple program instructions. The instructions received from the preprocessing unit (200) may be individual program instructions that are not combined or single combined instructions converted from multiple program instructions. Each execution unit (execution unit A (202A), execution unit N (202N)) may be an execution core or execution slice.

Figure 3:
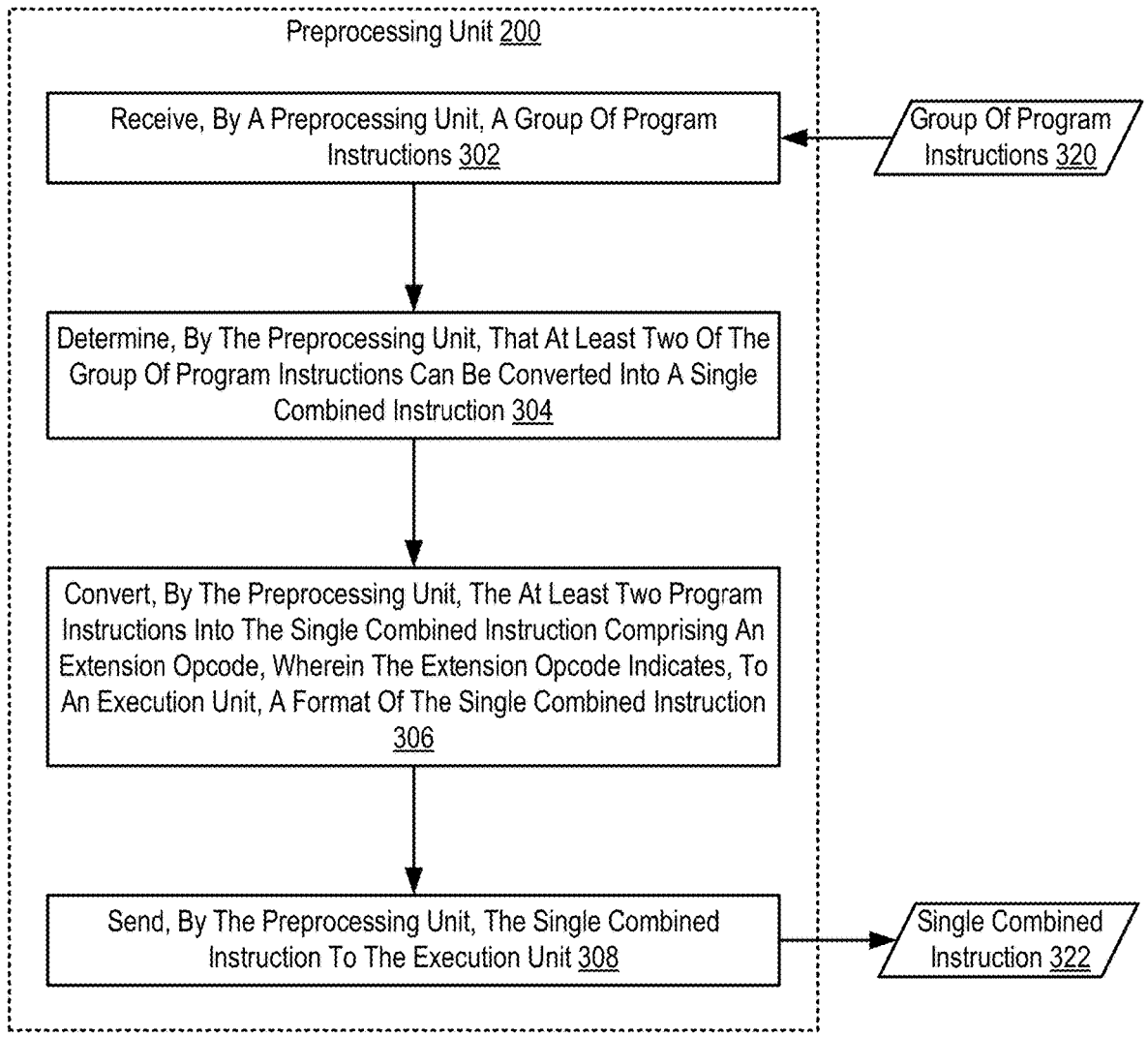
FIG. 3 sets forth a flow chart illustrating an exemplary method for converting program instructions for two-stage processors according to embodiments of the present invention.

For further explanation, FIG. 3 sets forth a flow chart illustrating an exemplary method for converting program instructions for two-stage processors according to embodiments of the present invention that includes receiving (302), by a preprocessing unit (200), a group of program instructions (320). Receiving (302), by a preprocessing unit (200), a group of program instructions (320) may be carried out by loading the group of program instruction (320) into memory locations that may be evaluated by the preprocessing unit (200). Receiving (302), by a preprocessing unit (200), a group of program instructions (320) may also be carried out by monitoring a data stream for program instructions provided by other elements within the processor or elements external to the processor.

The method of FIG. 3 also includes determining (304), by the preprocessing unit (200), that at least two of the group of program instructions (320) can be converted into a single combined instruction (322). Determining (304), by the preprocessing unit (200), that at least two of the group of program instructions (320) can be converted into a single combined instruction (322) may be carried out by determining that the at least two program instructions each refer to the same memory location or processor register. For example, one program instruction may place a result in register A, while a subsequent program instruction may load a value from register A.

Determining (304), by the preprocessing unit (200), that at least two of the group of program instructions (320) can be converted into a single combined instruction (322) may be carried out using a set of rules for different types of program instructions. The preprocessing unit (200) may encounter one type of instruction, and search the remaining group of program instructions for one or more program instructions that satisfy a rule stating the program instructions may be converted into a single combined instruction.

Determining (304), by the preprocessing unit (200), that at least two of the group of program instructions (320) can be converted into a single combined instruction (322) may be carried out by searching fields within the group of program instructions for two or more program instructions that include fields that satisfy a rule. The preprocessing unit (200) may search the fields within the group of processing instructions for corresponding processor registers or memory locations (e.g., a reference to the same processor register or memory location, different references that target the same processor register or memory location, etc.).

Determining (304), by the preprocessing unit (200), that at least two of the group of program instructions (320) can be converted into a single combined instruction (322) may be carried out by applying a rule that includes the type of instructions and a content of fields within the instruction. A rule may dictate that two instructions may be converted into a single combined instruction if the instruction types satisfy one part of the rule, and if the fields within the instructions satisfy a second part of the rule.

For example, the preprocessing unit (200) may receive an add-immediate-shift instruction that places a result in a destination register "RT", and an add-immediate instruction that reads the value from the register "RT". The preprocessing unit may determine that the result of the add-immediate-shift instruction is used as input in the add-immediate instruction, and therefore determine that the two instructions can be converted into a single combined instruction. The determination may be based, for example, on a rule stating that an add-immediate-shift instruction and an add-immediate instruction may be converted to a single combined instruction if the result of the add-immediate-shift instruction is used as an input for the add-immediate instruction.

The method of FIG. 3 also includes converting (306), by the preprocessing unit (200), the at least two program instructions into the single combined instruction (322) comprising an extension opcode, wherein the extension opcode indicates, to an execution unit, a format of the single combined instruction. Converting (306), by the preprocessing unit (200), the at least two program instructions into the single combined instruction (322) comprising an extension opcode, wherein the extension opcode indicates, to an execution unit, a format of the single combined instruction may be carried out by selecting a format of the single combined instruction. The format of the single combined instruction refers to a type of structure of the single combined instruction and identifies portions of the single combined instruction and a manner in which the portions are to be used.

The format may be selected based on the at least two program instructions determined to be converted into the single combined instruction. The format may indicate a portion of the single combined instruction that is an operation, the portion of the single combined instruction that is an operand, the portion of the single combined instruction that is a memory location for storing a final result of the single combined instruction, and/or the portion of the single combined instruction that is a program instruction. Examples of formats include, but are not limited to, "[extension opcode], [memory location], [program instruction]", "[extension opcode], [memory location 1], [memory location 2], [program instruction]", and "[extension opcode], [register 1], [register 2], [program instruction]".

The extension opcode may also indicate, to the execution units, the selected format. The extension opcode may be an identifier, such as a number, that corresponds to a format, such that an execution unit evaluating the extension opcode within the single combined instruction (322) determines the manner in which the single combined instruction (322) will be processed based on the extension opcode. For example, the four leftmost bits of the single combined instruction may indicate the format (out of a possible 16 different formats) of the single combined instruction. The format may then dictate the content of the remaining bits of the single combined instruction (e.g., the next four bits are an operand, followed by four bits indicating a memory location, followed by a 16 bit program instruction).

The extension opcode may include information in addition to the format indicator, such as an operand for processing the single combined instruction (322). The operand within the single combined instruction (322) may be a value or a register number containing a value that is applied to an intermediate result of the single combined instruction (322) (e.g., to the result of a program instruction imbedded within the single combined instruction).

Converting (306), by the preprocessing unit (200), the at least two program instructions into the single combined instruction (322) comprising an extension opcode, wherein the extension opcode indicates, to an execution unit, a format of the single combined instruction may also be carried out by extracting data from a field of one of the at least two program instructions and converting the extracted data into a structure consistent with the selected format. For example, one program instruction that stores an intermediate result in a first register may be combined with another program instruction that manipulates the intermediate result and stores the final result in a second register.

The following is a list of example opcode types for converting program instructions for two-stage processors:

Extension Opcode Type 1: Extend immediate-16 field of an existing instruction set architecture (ISA) with an immediate-16 field to form an immediate-32 field. For example, the following pairs of processor instructions may be converted into a single combined instruction with extension opcode type 1: "addis RT,RS,SI1" and "addi RT,RT,SI2", where SI1 and SI2 are signed integer values; "addis RT,RS,SI1" and "ld RX,D(RT)"; and "addpcis RT,SI1" and "ld RX,D(RT)", where D is a displacement from a base address.

Extension Opcode Type 2: Add immediate-16 to the effective address (EA) of an indexed load/store ISA instruction (EA=RA+RB+EXTS(immediate-16)). For example, the following pairs of processor instructions may be converted into a single combined instruction with extension opcode type 2: "addi RT,RS,SI" and "ldx RC,RT,RB"; and "addi RT,RS,SI and "stwx RS,RT,RB".

Extension Opcode Type 3: RS=RS+immediate-16 (Replace the contents of (first) source register, RS, of program instruction with its current contents plus a value indicated by an immediate-16 field). For example, the following pairs of processor instructions may be converted into a single combined instruction with extension opcode type 3: "addi RS, RS,SI" and "rldicl RT,RS,SH,MB"; and "addis RS,RS,SI" and "rldicr RT,RS,SH,ME".

Extension Opcode Type 4: RT=RT of program instruction operated on by new immediate-16 field. (RT=RT [operator] immediate-16). For example, the following pairs of processor instructions may be converted into a single combined instruction with extension opcode type 4: "rldicl RT,RS,RB,MB" and "addi RT,RT,SI and "rldicr RT,RS,RB,ME" and "ori RT,RT,UI".

Extension Opcode Type 5: RT=target/source of a load/store using EA=RT of program instruction+[operator] RC. For example, the following pairs of processor instructions may be converted into a single combined instruction with extension opcode type 5: "rldic RB,RC,SH,MB", and "lwax RA,RA,RB".

Extension Opcode Type 6: RT=RT of ISA instruction operated on by new RC field. (RT=RT [operator] RC). For example, the following pairs of processor instructions may be converted into a single combined instruction with extension opcode type 6: "rldicl RT,RS,RB, MB" and "add RT,RT,RC"; and "rldicr RT,RS,RB,ME" and "or RT,RT,RC".

Extension Opcode Type 7: RT=RT of ISA instruction operated on by new RC and RD fields. (RT=RT [operator] RC,RD).

Extension Opcode Type 8: RT=target/source of a fixed or vector loaded/stored from EA=RT of ISA instruction+[operator]RC.

Extension Opcode Type 9: RT=new independent operation with new RC and RD fields. (e.g. RT=RB[operator]RC).

Extension Opcode Type 10: VT2=odd result of an even vector ISA instruction. (e.g. odd result of an even vector multiply), RT2=additional results of a program instruction (e.g. low result of multiply-add high, remainder for divide, etc.), or other additional result of a program instruction (e.g. program instruction that is not fused).

The method of FIG. 3 also includes sending (308), by the preprocessing unit (200), the single combined instruction (322) to the execution unit. Sending (308), by the preprocessing unit (200), the single combined instruction (322) to the execution unit may be carried out by sending the single combined instruction (322) via a communications bus within the processor.

Sending (308), by the preprocessing unit (200), the single combined instruction (322) to the execution unit may also be carried out by selecting an execution unit as a destination for the single combined instruction (322). The selection may be based on the extension opcode within the single combined instruction (322). Specifically, the preprocessing unit (200)

may select an execution unit appropriate for the format of the single combined instruction (322).

Figure 4:
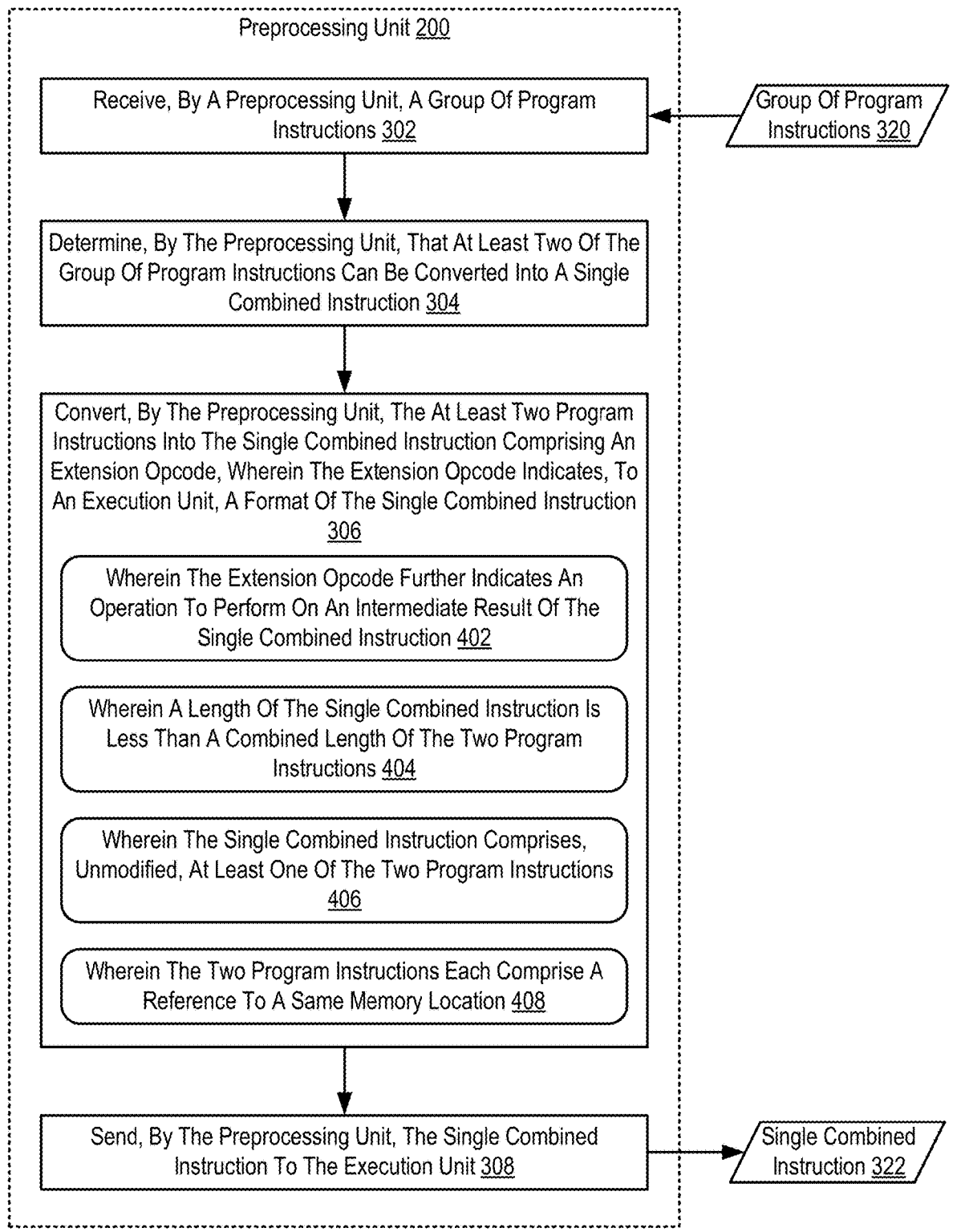
FIG. 4 sets forth a flow chart illustrating an exemplary method for converting program instructions for two-stage processors according to embodiments of the present invention.

For further explanation, FIG. 4 sets forth a flow chart illustrating a further exemplary method for converting program instructions for two-stage processors according to embodiments of the present invention that includes receiving (302), by a preprocessing unit (200), a group of program instructions (320); determining (304), by the preprocessing unit (200), that at least two of the group of program instructions (320) can be converted into a single combined instruction (322); converting (306), by the preprocessing unit (200), the at least two program instructions into the single combined instruction (322) comprising an extension opcode, wherein the extension opcode indicates, to an execution unit, a format of the single combined instruction; and sending (308), by the preprocessing unit (200), the single combined instruction (322) to the execution unit.

The method of FIG. 4 differs from the method of FIG. 3, however, in that converting (306), by the preprocessing unit (200), the at least two program instructions into the single combined instruction (322) comprising an extension opcode, wherein the extension opcode indicates, to an execution unit, a format of the single combined instruction includes wherein (402) the extension opcode further indicates an operation to perform on an intermediate result of the single combined instruction, wherein (404) a length of the single combined instruction is less than a combined length of the two program instructions, wherein (406) the single combined instruction comprises, unmodified, at least one of the two program instructions, and wherein (408) the two program instructions each comprise a reference to a same processor register or memory location.

Wherein (402) the extension opcode further indicates an operation to perform on an intermediate result of the single combined instruction may be carried out by including, within the extension opcode, the operation or indication of the operation. A portion of the single combined instruction (322) may be used to calculate the intermediate result. For example, the intermediate result may be obtained by executing an unmodified program instruction included within the single combined instruction (322). The extension opcode may then indicate an operation to perform on the intermediate result of the program instruction. The indication of an operation may be an instruction, or a shorthand instruction. An operation is a process performed on data, such as the intermediate result.

The extension opcode may indicate the manner in which an operand is used for the operation. The operand may be, for example, a reference to a memory location, a processor register address, or a numeric value, such as an integer. The operand may be in a specific position within the single combined instruction (322). The extension opcode may indicate an operation to perform using the operand.

Wherein (404) a length of the single combined instruction is less than a combined length of the two program instructions may be carried out by converting the at least two of the group of program instructions into a single combined instruction (322) that is less than the total length of the combination of the at least two program instructions. For example, two 32-bit program instructions may be converted into a single combined instruction that is less than 64-bits in length. The single combined instruction may include an unmodified 32-bit program instruction (or internal operation) and an extension opcode that is less than 32-bits (e.g., 20-bits), for a total single combined instruction length of less than 64-bits (e.g., 52-bits).

Wherein (406) the single combined instruction comprises, unmodified, at least one of the two program instructions may be carried out by embedding, within the single combined instruction (322), an unmodified program instruction that is one of the at least two program instructions. For example, [program-instruction-A] and [program-instruction-B] may be converted into the single combined instruction [extension opcode, program-instruction-A].

The single combined instruction may include a decoded version of one of the at least two program instructions. One of the at least two program instructions may be decoded into one or more internal operations for processing by the execution units. The single combined instruction may include the one or more internal operations decoded from one of the at least two program instructions.

Wherein (408) the two program instructions each comprise a reference to a same memory location. Each program instruction determined to be able to be converted into a single combined instruction may each include a reference to the same memory location, such as a register address. For example, a first program instruction may store a result in register A, and a second program instruction may read data from register A. The first program instruction and second program instruction may be converted into a single combined instruction that uses register A to store an intermediate result or bypass storage of the intermediate result.

Figure 5:
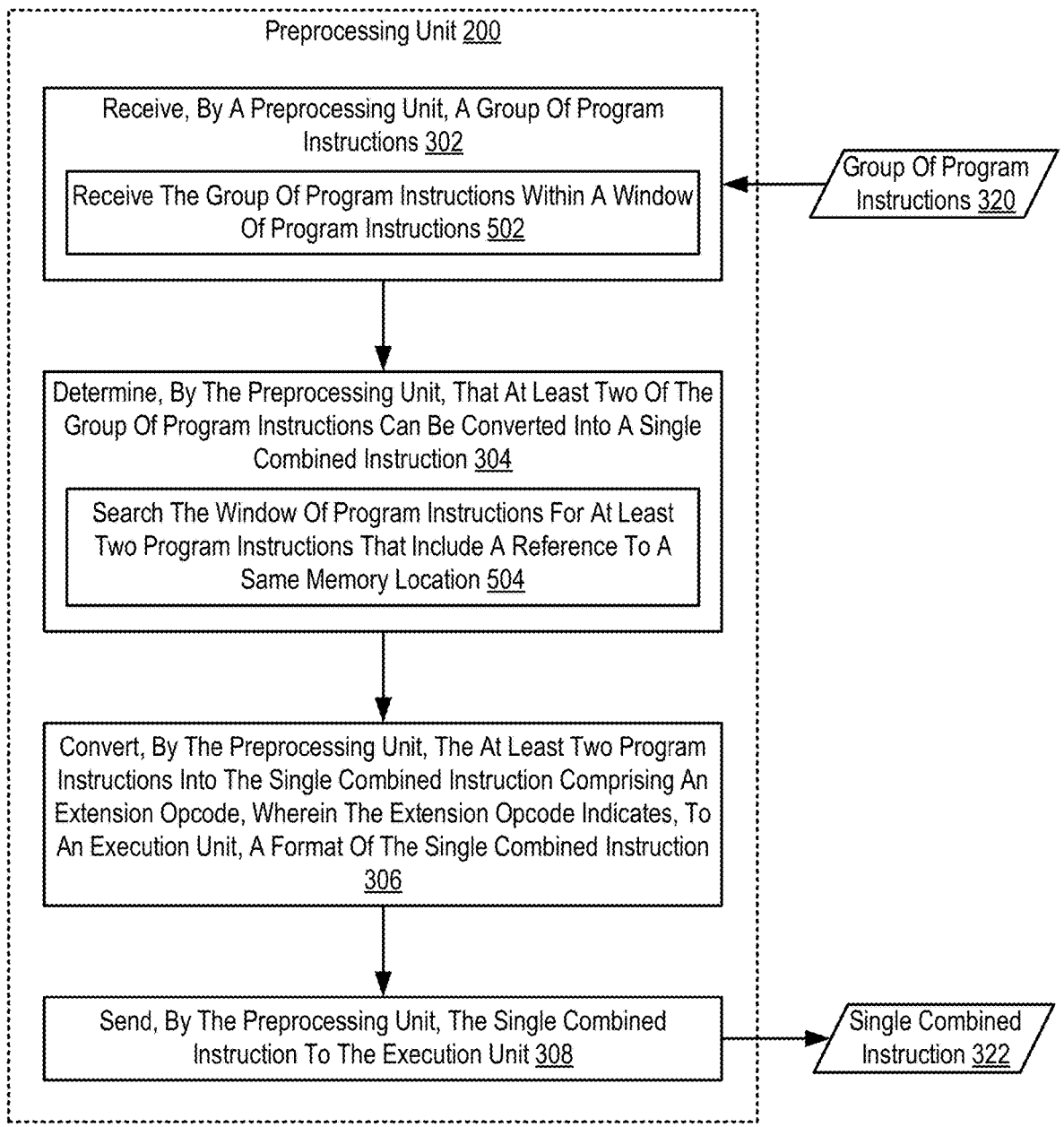
FIG. 5 sets forth a flow chart illustrating an exemplary method for converting program instructions for two-stage processors according to embodiments of the present invention.

For further explanation, FIG. 5 sets forth a flow chart illustrating a further exemplary method for converting program instructions for two-stage processors according to embodiments of the present invention that includes receiving (302), by a preprocessing unit (200), a group of program instructions (320); determining (304), by the preprocessing unit (200), that at least two of the group of program instructions (320) can be converted into a single combined instruction (322); converting (306), by the preprocessing unit (200), the at least two program instructions into the single combined instruction (322) comprising an extension opcode, wherein the extension opcode indicates, to an execution unit, a format of the single combined instruction; and sending (308), by the preprocessing unit (200), the single combined instruction (322) to the execution unit.

The method of FIG. 5 differs from the method of FIG. 3, however, in that receiving (302), by a preprocessing unit (200), a group of program instructions (320) includes receiving (502) the group of program instructions within a window of program instructions. Receiving (502) the group of program instructions within a window of program instructions may be carried out by storing the group of program instructions in memory for evaluation of the group of program instructions as a whole. For example, the group of program instructions that fit into a set of memory locations may be referred to as a window. Alternatively, a window of program instructions may refer to a group of program instructions that may be evaluated without expending an unacceptable amount of computations.

The method of FIG. 5 also differs from the method of FIG. 3 in that determining (304), by the preprocessing unit (200), that at least two of the group of program instructions (320) can be converted into a single combined instruction (322) includes searching (504) the window of program instructions for at least two program instructions that include a reference to a same processor register or memory location. Searching (504) the window of program instructions for at least two program instructions that include a reference to a same processor register or memory location may be carried out by comparing the fields of each program instruction in the window of program instructions to determine at least two program instructions that reference the same processor register or memory location. Consequently, the at least two program instructions may be evaluated to determine whether the program instruction are of a type that can be converted into a single combined instruction (322).

For example, a window of program instructions may include an add-immediate-shifted program instruction and an add-immediate program instruction. The two instructions may reference the same processor register and may be of a type that can be converted to a single combined instruction. The preprocessing unit (200) may then determine that the two program instructions can be converted into a single combined instruction (322).

In view of the explanations set forth above, readers will recognize that the benefits of converting program instructions for two-stage processors according to embodiments of the present invention include:

Reducing number of instructions transmitted between the preprocessing unit and the execution units, decreasing traffic within the processor and increasing efficiency.

Enabling the processing hardware to transfer program semantics from the front end to the back end more efficiently than existing instruction sets, increasing overall processor efficiency.

Exemplary embodiments of the present invention are described largely in the context of a fully functional computer system for converting program instructions for two-stage processors. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A preprocessing unit for converting program instructions for two-stage processors, the preprocessing unit configured for:
   receiving a group of program instructions;
   determining that at least two of the group of program instructions can be converted into a single combined instruction;
   converting the at least two program instructions into the single combined instruction comprising an extension opcode, wherein the extension opcode indicates, to an execution unit, a format of the single combined instruction, wherein the format indicates which respective bits of the single combined instruction correspond respectively to: an operand, a memory location, and a program instruction of the at least two program instructions; and
   sending the single combined instruction to the execution unit.

2. The preprocessing unit of claim 1, wherein the extension opcode further indicates an operation to perform on an intermediate result of the single combined instruction.

3. The preprocessing unit of claim 1, wherein a length of the single combined instruction is less than a combined length of the two program instructions.

4. The preprocessing unit of claim 1, wherein the single combined instruction comprises, unmodified, at least one of the two program instructions.

5. The preprocessing unit of claim 1, wherein the two program instructions each comprise a reference to a same memory location.

6. The preprocessing unit of claim 1,
   wherein receiving, by the preprocessing unit, the group of program instructions comprises receiving the group of program instructions within a window of program instructions; and
   wherein determining, by the preprocessing unit, that at least two of the group of program instructions can be converted into the single combined instruction comprises searching the window of program instructions for at least two program instructions that include a reference to a same memory location.

7. The preprocessing unit of claim 1, wherein the single combined instruction is an internal operation instruction.

8. A computing system, the computing system including a preprocessing unit for converting program instructions for two-stage processors, the preprocessing unit configured for:
   receiving, by the preprocessing unit, a group of program instructions;
   determining, by the preprocessing unit, that at least two of the group of program instructions can be converted into a single combined instruction;
   converting the at least two program instructions into the single combined instruction comprising an extension opcode, wherein the extension opcode indicates, to an execution unit, a format of the single combined instruction, wherein the format indicates which respective bits of the single combined instruction correspond respectively to: an operand, a memory location, and a program instruction of the at least two program instructions; and
   sending, by the preprocessing unit, the single combined instruction to the execution unit.

9. The computing system of claim 8, wherein the extension opcode further indicates an operation to perform on an intermediate result of the single combined instruction.

10. The computing system of claim 8, wherein a length of the single combined instruction is less than a combined length of the two program instructions.

11. The computing system of claim 8, wherein the single combined instruction comprises, unmodified, at least one of the two program instructions.

12. The computing system of claim 8, wherein the two program instructions each comprise a reference to a same memory location.

13. The computing system of claim 8,
   wherein receiving, by the preprocessing unit, the group of program instructions comprises receiving the group of program instructions within a window of program instructions; and
   wherein determining, by the preprocessing unit, that at least two of the group of program instructions can be converted into the single combined instruction comprises searching the window of program instructions for at least two program instructions that include a reference to a same memory location.

* * * * *